United States Patent [19]

Millot et al.

[11] Patent Number: 5,124,113
[45] Date of Patent: Jun. 23, 1992

[54] NUCLEAR REACTOR WITH IMPROVED EFFICIENCY

[75] Inventors: Jean-Paul Millot, Elancourt; Guy Desfontaines, Puteaux, both of France

[73] Assignee: Framatome & Cie., Courbevoie, France

[21] Appl. No.: 843,843

[22] Filed: Mar. 27, 1986

Related U.S. Application Data

[63] Continuation of Ser. No. 531,797, Sep. 13, 1983, abandoned.

[30] Foreign Application Priority Data

Oct. 27, 1982 [FR] France .............................. 82 18012

[51] Int. Cl.⁵ .............................................. G21C 7/00
[52] U.S. Cl. ........................................ 376/209; 376/220; 376/352; 376/458; 376/327; 376/428
[58] Field of Search ............... 376/209, 212, 213, 339, 376/172, 220, 223, 224, 307, 333, 334, 302, 353, 458, 428

[56] References Cited

U.S. PATENT DOCUMENTS

| | | | |
|---|---|---|---|
| 2,852,456 | 9/1958 | Wade | 376/172 |
| 2,929,768 | 3/1960 | Mahlmeister et al. | 376/339 |
| 3,287,225 | 11/1966 | Ackroyd et al. | 376/220 |
| 3,361,636 | 1/1968 | Bagge et al. | 376/209 |
| 3,481,832 | 12/1969 | Rickert | 376/353 |
| 3,519,535 | 7/1970 | French et al. | 376/224 |
| 3,595,748 | 7/1971 | Frisch et al. | 376/224 |
| 3,687,804 | 8/1972 | Mills et al. | 376/458 |
| 3,734,825 | 5/1973 | Schabert et al. | 376/224 |
| 3,753,856 | 8/1973 | Ash | 376/302 |
| 3,755,078 | 8/1973 | Stelle | 376/302 |
| 4,257,847 | 3/1981 | Gibby et al. | 376/172 |
| 4,381,281 | 4/1983 | Long et al. | 376/172 |
| 4,409,179 | 10/1983 | Burger | 376/302 |
| 4,481,164 | 11/1984 | Bollinger | 376/209 |

FOREIGN PATENT DOCUMENTS

| | | | |
|---|---|---|---|
| 798466 | 7/1958 | United Kingdom | 376/339 |
| 963791 | 7/1964 | United Kingdom | 376/223 |
| 2089556 | 6/1982 | United Kingdom | 376/339 |

OTHER PUBLICATIONS

Nuclear Eng. Int., Oct. 1971, vol. 16, No. 185, pp. 857–859, Heil.

Primary Examiner—Harvey E. Behrend
Attorney, Agent, or Firm—Pollock, Vande Sande & Priddy

[57] ABSTRACT

The invention relates to a nuclear reactor with improved efficiency.

The nuclear reactor comprises a massive partition (18) of material reflecting high energy neutrons at the circumference of the core (7) of the reactor, two layers (19 and 20) of material absorbing low energy neutrons and containing fertile material arranged one at the lower part and one at the upper part of the core (7) and an assembly of neutron energy spectrum variation rods (27). The rods (27) are associated with mechanisms permitting them to be either fully inserted into the core (7), or fully extracted. These rods (27) consist of a material absorbing low energy neutrons and permit a shift of the neutron spectrum towards the high energies.

The invention is particularly applicable to pressurized water nuclear reactors.

11 Claims, 3 Drawing Sheets

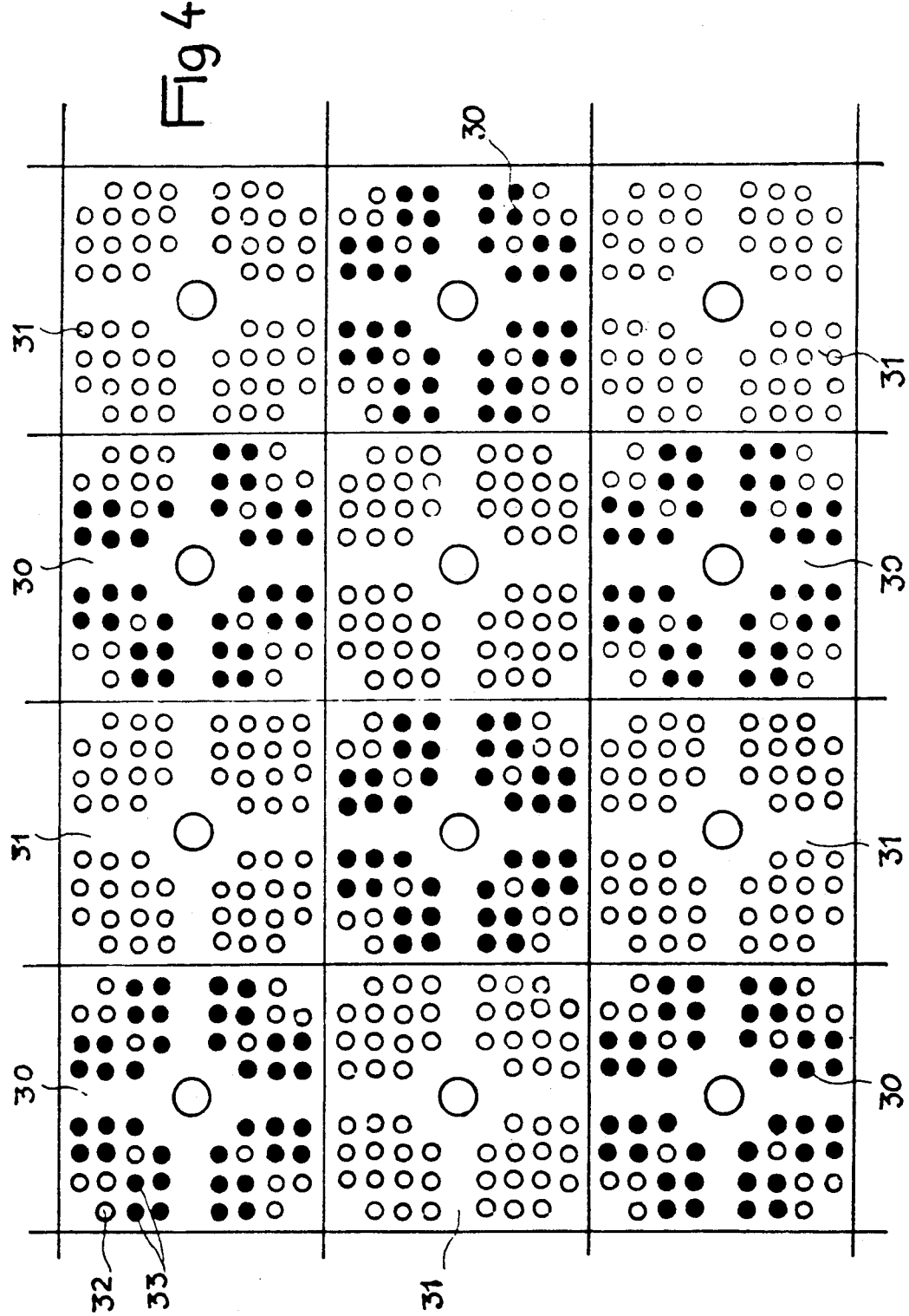

NUCLEAR REACTOR WITH IMPROVED EFFICIENCY

This application is a continuation of application Ser. No. 531,797, filed Sept. 13, 1983, now abandoned.

BACKGROUND OF THE INVENTION

The invention relates to a nuclear reactor with improved efficiency capable of better utilization of the fuel material of the core arrays.

Nuclear reactors cooled and moderated by pressurized light water comprise a vessel containing the reactor core immersed in pressurized water filling the vessel. The core of the reactor comprises tall arrays relative to their cross-section arranged vertically and side by side. The arrays themselves consist of bundles of fissile fuel rods in contact by their external surface with the cooling water of the reactor.

For the operation of the reactor, an assembly of control rods associated with certain arrays of the core is used. These control rods consist of parallel bars of strongly neutron-absorbing material which can be moved vertically within guide tubes replacing some fuel rods in the arrays forming the core.

One of the major problems involved in the operation of nuclear reactors is to obtain high efficiency as regards the use of the nuclear fuel of the arrays. This fuel generally consists of uranium in the form of uranium oxide containing fertile uranium 238 preponderantly and a quantity of fissile uranium 235 which varies as a function of the enrichment of the fuel.

During the operation of the reactor, the fissile fuel is consumed so that it is necessary to replace at least a part of the core arrays of the reactor after a certain period of operation.

The cost of the operations to enrich, recharge, replace the used fuel and withdraw it is very high, so that it is desirable to make the best possible use of the fuel introduced into the reactor core in order to improve the economic operating conditions of the reactor.

It is particularly attempted to effect the most complete possible combustion of the uranium contained in the material of the arrays. By improving the combustion of the uranium, it is possible either to prolong the useful life of the core for a given initial charge of fissile uranium, or to reduce the initial charge of fissile uranium in the core for a given useful life. In the former case, the operating costs of the nuclear reactor are reduced by effecting recharges at longer intervals of time. In the latter case, it will be possible, for example, either to reduce the volume and the total mass of the fuel rods of the core, or again to use a fuel with a lower degree of enrichment. In this way the cost of the fuel charge will be reduced.

In order to operate the reactor, that is to say in order to regulate the reactivity of the core, neutron-absorbing materials are used either in the form of control rods which are inserted into the core of the reactor, or in the form of elements dissolved in the cooling and moderating water of the reactor. After the core is charged, its reactivity is high, so that it is necessary to use absorbing materials in increased quantity for the operation of the reactor. For example, clusters of rods containing consumable poisons are introduced into the guide tubes of some arrays of the core, or again neutron-absorbing poisons are introduced in considerable quantity into the cooling water.

When the excess reactivity decreases due to the exhaustion of the fuel, the concentration of the neutron-absorbing poisons which are dissolved is decreased correspondingly. These neutron-absorbing poisons, which are necessary for the operation of the reactor in its initial state, are expensive in themselves and reduce the energetic efficiency of the fissile fuel contained in the core.

It has been proposed to utilize the excess reactivity of the core in its initial state to produce a fissile fuel (plutonium 239) from the uranium 238 contained in the fuel of the arrays. To do this, the neutron energy spectrum in the core is shifted towards the high energies, by reducing the ratio of the volume of moderator to the volume of fuel in the core, during the first part of the fuel cycle. When the excess reactivity of the fuel becomes virtually zero, the ratio of volume of moderator to volume of fuel is restored to a value permitting the neutron spectrum to be restored to its customary zone for pressurized water nuclear reactors. The neutrons are then said to be "thermal" or "slow". This has the effect of producing a fresh excess of reactivity, which permits the period of use of the fuel to be prolonged.

The ratio of moderator volume to fuel volume is influenced by introducing into the first part of the fuel cycle, bars of neutron-transparent material within some guide tubes of the core arrays. In this way the water contained by these guide tubes is expelled and the volume of moderator in the core is reduced by this amount.

To obtain an appreciable effect, it is necessary to displace approximately 20% of the cooling water during almost 60% of the useful life of the core. To do this, it is necessary to use a very large number of neutron-transparent rods introduced into all the guide tubes of the core arrays, with the exception of those used for the guidance of the absorbing control rods of the reactor.

This considerably complicates the conception and the design of the reactor.

In fact, all the equipments containing the core of the reactor must be dimensioned so as to be able to perform the guidance above the core and the control in translation of the spectrum variation rods. This conception therefore dictates the insertion of a large number of guide tubes in that part of the internal equipments through which the heat-laden water normally escapes, to the detriment of the water balance of the reactor. It is therefore necessary to adopt a fresh conception of the circulating of the coolant in the reactor vessel. Moreover, the control in translation of these clusters necessitates the location on the cover of the vessel of a very large number of control mechanisms which must be interposed with the existing mechanisms of the control clusters permitting the running of the reactor. All these demands lead particularly, for equal power, to an increase in the dimensions of the reactor vessel compared to a conventional reactor.

Moreover, a shift of the neutron spectrum towards the high energies involves an increased loss of neutrons outside the reactor and greater "embrittlement" of the steel of the reactor vessel.

SUMMARY OF THE INVENTION

The invention therefore aims to propose a nuclear reactor with improved efficiency comprising a vessel containing a core consisting of arrays of fissile fuel arranged side by side and vertically, immersed in pressurized light water forming the moderator and cooling fluid of the reactor and control rods of neutron-absorbing material movable vertically in the core to regulate the power of the reactor. this nuclear reactor permitting improved utilization of the fuel of the arrays and a reduction of the neutron flow, hence of the embrittlement effect of the steel of the reactor vessel, whilst being simple in design and conception.

To this end. the nuclear reactor according to the invention further comprises:

a massive metal partition of material reflecting high energy neutrons arranged at the circumference of the core and over its entire height.

two layers of material absorbing low energy neutrons and containing fertile material arranged one at the lower part of the core and the other at its upper part, throughout its cross-section.

an assembly of neutron energy spectrum variation rods of a material absorbing low energy neutrons associated with vertical movement devices permitting their total insertion into at least a part of the arrays of the core or their total extraction so as to vary the ratio of the volume of the moderator to the volume of fissile material in the core and to shift the neutron energy spectrum, these rods being distributed regularly throughout the cross-section of the core.

According to a preferred embodiment, the spectrum variation rods are associated with one fuel array in two in the core, according to a checkerboard arrangement.

BRIEF DESCRIPTION OF THE DRAWING

To enable the invention to be fully understood, a high power nuclear reactor according to the invention will now be described by way of example, not implying a limitation.

FIG. 4 is a view of a larger scale of part of the cross-section of the core illustrated in FIG. 3. showing the arrangement of the control rods and spectrum variation rods in the arrays of the reactor core.

FIG. 1 shows the vessel 1 of the reactor closed by a domed cover 2.

DETAILED DESCRIPTION

Figure 1:
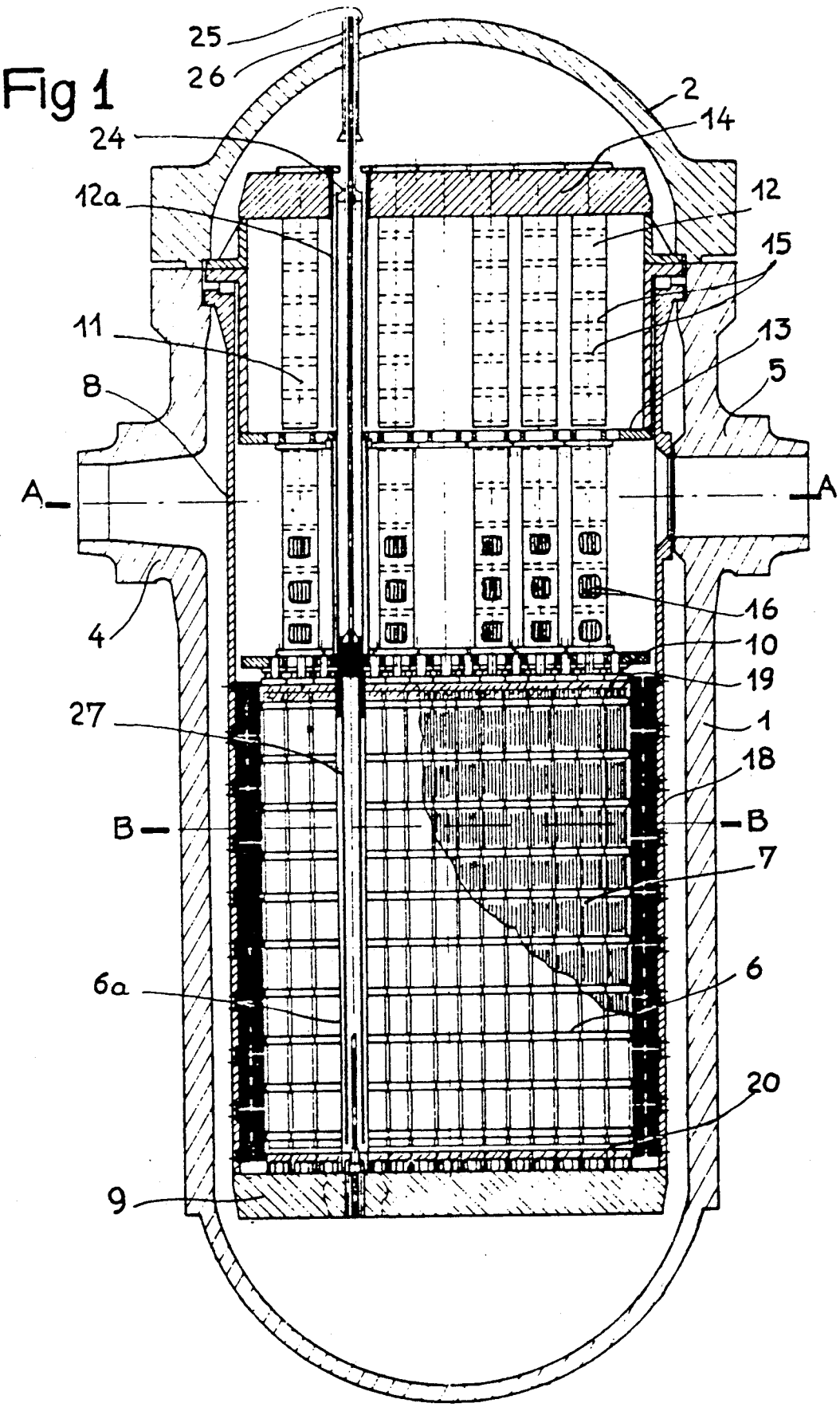
FIG. 1 is a view in section through a vertical plane of symmetry of the vessel of the nuclear reactor.
Figure 2:
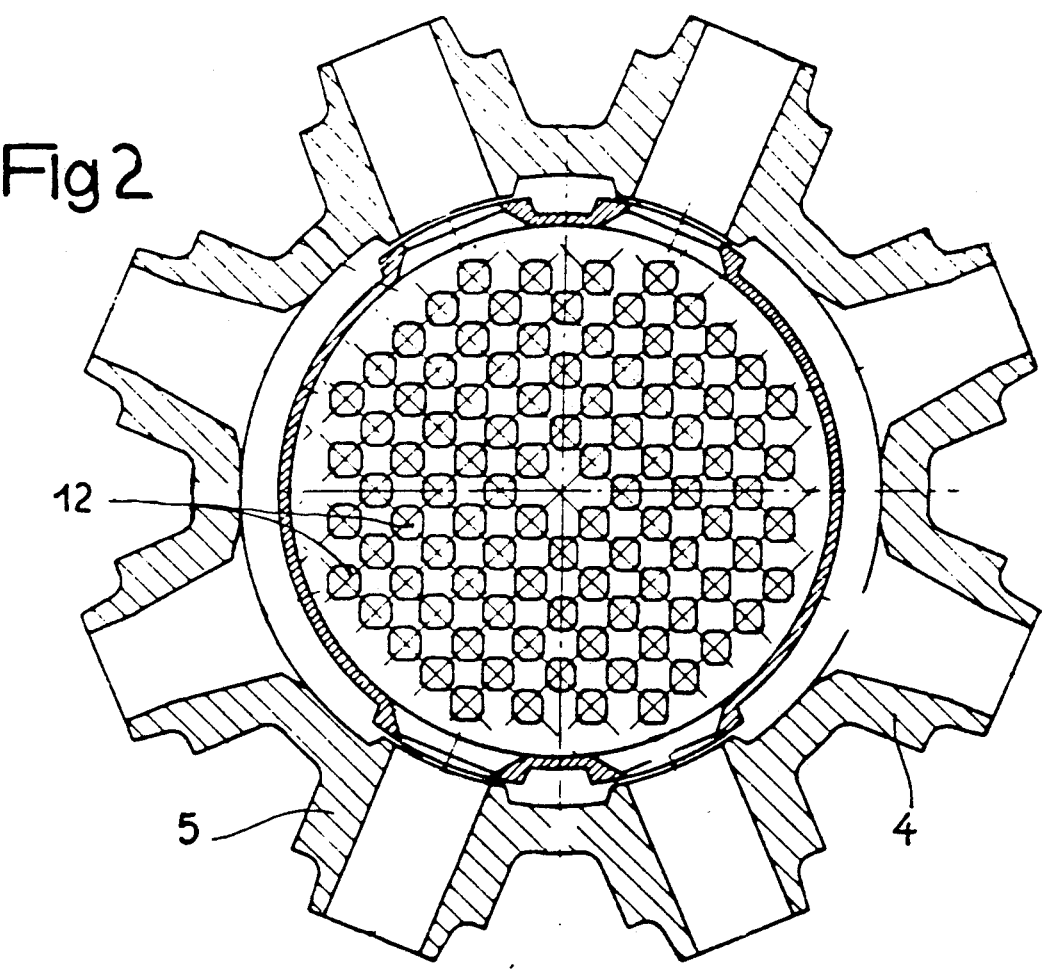
FIG. 2 is a view in section through AA of FIG. 1.

As FIGS. 1 and 2 show, the vessel comprises four pressurized water light tubes 4 and four water outlet tubes 5. The tubes 4 are connected to the cold branches of the primary circuit of the reactor and the tubes 5 to the hot branches carrying the pressurized water heated by contact with the arrays 6 of the core 7 of the reactor to steam generators not shown.

The internal equipments, comprising particularly a thimble 8 forming the casing of the core 7 and carrying at its lower part the support plate 9 of the core, are suspended within the vessel 1. The plate 9 is pierced apertures corresponding to the arrays of the core. As FIG. 3 shows, the core comprises one hundred and ninety-three arrays of square cross-section resting upon the plate 9.

The upper internal equipments 11 of the reactor are located above the core 7. These upper internal equipments 11 comprise the guide tubes 12 of the rods, serving as spacing elements and effecting connection between an intermediate plate 13 and a core plate 10 to which they are attached. The internal equipments likewise comprise an upper plate 14, to which the upper parts of the tubes 12 are attached. The plates 13 and 14 are attached to thimbles coaxial to the thimble 8 and maintained, like the thimble 8. between the cover 2 and the vessel 1. The tubes 12 contain guide cards 15 and continuous guide devices permitting the rods to be maintained and guided during their vertical movements in the core. At their lower part the tubes 12 are pierced with orifices 16 to permit the exit of the water traveling through the arrays equipped with a cluster, to the outlet tubes of the vessel. These tubes 12 are constructed in two parts, the upper part of the tubes is suspended from the upper plate 14, and their lower part acts as a spacing element between the plates 10 and 13.

Figure 3:
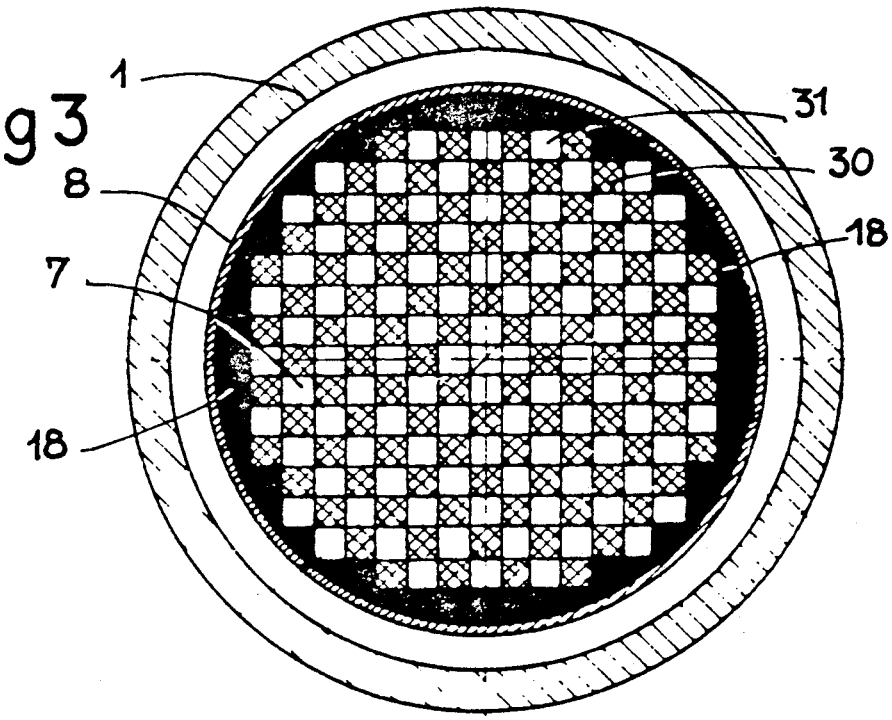
FIG. 3 is a view in section through BB of FIG. 1.

The annular space included between the core 7, the cross-section of which is shown in FIG. 3, and the core casing 8 is filled by a massive partition 18 of stainless steel acting as a reflector particularly for the high energy neutrons produced in the core. The massive partition 18 occupies virtually the entire volume included between the core and the core casing.

The fuel rods of the arrays consist of long zirconium tubes containing pellets of uranium oxide enriched with uranium 235. At each of their ends the zirconium tubes are filled for a length of approximately ten centimeters by pellets of uranium oxide ($UO_2$) depleted of uranium 235 replacing the pellets of enriched uranium oxide. Thus two practically continuous layers 19 and 20 of depleted uranium are formed at the upper end and at the lower end of the core respectively.

These layers 19 and 20 permit the absorption of the low energy neutrons and supply uranium 238 which can be transformed into plutonium 239 by the effect of the bombardment by the high energy neutrons.

The stainless steel partition 18 and the depleted uranium layers 19 and 20 thus make it possible to limit to a minimum the escape of neutrons out of the core, which improves the efficiency of the reactor.

The flow in the proximity of the vessel is also reduced by this means.

FIG. 2 shows generally the guide tubes 12 permitting the guidance of the rods in the reactor core. For the entire core, ninety-six clusters of absorbing rods are used, each of these clusters being capable of being introduced into the guide tubes of an array.

FIG. 1 shows such a cluster of absorbing rods or control rod 24 in the top position, it being attached to an actuating rod 25 itself movable in a tubular chamber 26 communicating with the interior of the vessel. A movement mechanism for the rod 25, not shown, is placed at the top of the chamber 26. Such a mechanism, of the conventional pawl type, permits the control rod 24 to be removed in the vertical direction, and with great precision, within the guide tubes of the array 6a arranged above the tube 12a.

FIG. 1 likewise shows an assembly of neutron energy spectrum variation rods 27 fully inserted into the guide tubes of the array 6a. These neutron energy spectrum variation rods consist of a cluster of tubes of zirconium alloy filled with pellets of depleted uranium throughout their length.

The control clusters, and also the neutron energy spectrum variation clusters, have the same length as the arrays.

The neutron spectrum variation rods 27 can be in one or the other of two positions, one of these positions being the fully inserted position shown in FIG. 1, and the other position the fully extracted position equivalent to the position of the control cluster 24 shown in FIG. 1. A movement device associated with the spectrum variation rod 27 permits it to be moved from one to the other of these two positions. In their fully inserted position the absorbing rods forming the spectrum variation rod are engaged in the array 6 throughout their length.

Referring to FIGS. 2 and 3, it is clear that for a core comprising one hundred and ninety-three arrays, ninety-six guide tubes 12 are used, each permitting the simultaneous guidance of a control rod 24 and of a spectrum variation rod 27. It is likewise clear that these guide tubes 12 are arranged above fuel arrays 30 arranged checkerboard-fashion in the cross-section of the core. One array in two is therefore equipped simultaneously with a control rod and with a spectrum variation rod of depleted uranium.

The arrays 31 adjacent to those arrays 30 equipped with control rods and with spectrum variation rods are given neither the one nor the other of these two types of absorbent rods.

Referring to FIG. 4, this shows the arrangement of the guide tubes 32 intended to receive control rods, and of the guide tubes 33 intended to receive spectrum variation rods. Each array comprises fifty-six guide tubes, of which sixteen tubes are intended to receive control rods and forty tubes intended to receive spectrum variation rods.

The guide tubes of the arrays 30 actually receive these rods during the operation of the reactor, whereas the corresponding guide tubes of the arrays 31 receive a cluster of plugs to create a head loss equivalent to that due to the rods introduced into the tubes 32 and 33 of the arrays 30.

The whole of the cluster 24 forming the control rod reproduces the transverse distribution of the guide tubes 32 illustrated in FIG. 4, whereas the whole of the cluster 27 reproduces the distribution of the guide tubes 33 likewise illustrated in FIG. 4.

At the start of the fuel cycle, that is to say after a charge, the movement mechanisms of the spectrum variation rods are used to place all the rods of depleted uranium in the position of maximum insertion in the arrays 30, so that the volume of moderator compared to the volume of fuel in the core of the reactor is considerably reduced. Furthermore, each of the depleted uranium rods of the spectrum variation rods absorbs the low energy neutrons locally, which causes an increased shift of the neutron spectrum towards the high energies.

This local effect repeated in the whole of the core by the spectrum variation rods distributed regularly in one array in two causes an overall effect of hardening the spectrum within the reactor core.

In this manner a sufficient spectrum shaft to produce an appreciable conversion of the uranium 238 of the fuel into plutonium 239 is achieved, both by the reduction in the volume of the moderator and by the absorption of the low energy neutrons.

The depleted uranium rods absorbs the slow neutrons surplus to those which are required to maintain the chain reaction in the core, and give rise to the formation of plutonium 239 by the effect of the bombardment by the higher energy neutrons.

After operating with the spectrum variation rods inserted during an appreciable part of the cycle of the reactor, these rods are extracted. After the extraction of the spectrum variation rods, the fissile material formed by the high energy neutron bombardment during the first phase is consumed within the core of the reactor.

By the increased effect of spectrum shift by the absorbing depleted uranium rods, and by the use of a stainless steel peripheral reflector and of absorbing layers of depleted uranium on each side of the core, at its lower part and its upper part, it is possible to equip only one fuel array in two in the core with an assembly comprising both a control rod and a spectrum variation rod.

FIG. 3 shows that, of the hundred and ninety-three fuel arrays forming the core, there are ninety-six arrays 30 which receive a control rod and a spectrum variation rod and ninety-seven arrays 31 which receive only a cluster of plugs.

It will therefore be possible to install above the cover 2 of the vessel 1 the movement mechanisms for the control rods comprising a coaxial insertion and extraction mechanism for the spectrum variation rods, whereas the arrangement of such mechanisms above each of the arrays would have been extremely difficult and would compromise the conception of the vessel, its cover and its internal equipments.

The device according to the invention therefore has the advantage of permitting all the control rods and spectrum variation rods to be positioned without necessitating any major modification of the vessel of a nuclear reactor of the pressurized water type. Moreover, by virtue of the reflector effect of the circumferential partition of the core of the absorption effect of the upper and lower layers of depleted uranium of the core, and of the increased spectrum shift effect of the neutron spectrum variation rods, the conditions of utilization of the fuel of the reactor core can be considerably improved.

These substantial improvements, which engender major economies in the cost of the fuel, are obtained at the cost of a relatively minor modification to the structure of the reactor.

The invention is not limited to the embodiment which has just been described; on the contrary, it comprises all variants thereof.

For instance, a different distribution of the guide tubes 32 and 33 receiving the control rod and the spectrum variation rod in each of the arrays 30 may be imagined. A different distribution of the arrays receiving the control rods and the spectrum variation rods may likewise be contemplated.

Configurations may also be imagined, in which these two types of rods are not associated with the same assemblies of the core. Clusters forming the control and spectrum variation rods comprising a different number of absorbing rods may likewise be imagined.

As to the spectrum variation rods, the use of different absorbent materials from depleted uranium, containing or not containing fertile material capable of being transformed into fissile material by the effect of the neutron bombardment, may be imagined.

Devices of any type, mechanical, hydraulic or pneumatic, for the movement of the control rods and for the total insertion or extraction of the spectrum variation rods may be imagined.

The invention is applicable to any nuclear reactor cooled and moderated by pressurized light water comprising fuel arrays arranged vertically within which control rods are moved vertically for the operation of the reactor.

We claim:

1. A pressurized water nuclear reactor comprising:
   a vessel;
   a core in said vessel consisting of a plurality of fuel assemblies arranged side by side and vertically, immersed in pressurized light water forming the moderator and cooling fluid of the reactor, each of said fuel assemblies having a bundle of fuel rods each having a central portion containing enriched fuel material and upper and lower end portions containing fertile material, whereby two layers of neutron absorbing fertile material are formed at the lower part of the core and the upper part of the core, throughout the cross-section of the core and further having a plurality of guide tubes parallel to said fuel rods and distributed in said fuel assemblies;

a plurality of control rod clusters containing neutron absorbing material and movable vertically along some only of said guide tubes in certain ones of said plurality of fuel assemblies for control of the power of the reactor;

a filling of metallic material reflecting high energy neutrons arranged at the circumference of the core and over the entire height thereof;

a plurality of neutron energy spectrum variation rod clusters associated with certain ones only of said fuel assemblies distributed throughout the core, each containing fertile material and vertically movable between a position of full insertion into some only of said guide tubes in the associated one of said fuel assemblies and a position out of said guide tubes; and a plurality of actuating devices each associated with one of said spectrum variation rod clusters for movement thereof between said two positions to vary the ratio of water to the volume of fissile material in the core and to shift the neutron energy spectrum, said spectrum variation rod clusters being distributed regularly throughout the cross-section of the core, wherein some of the fuel assemblies are continuously devoid of some control rod clusters and said spectrum variation rod clusters and plugs are located in all those guide tubes which do not receive one of said control rod clusters and spectrum variation rod clusters.

2. A pressurized water nuclear reactor comprising:
a vessel;
a core in said vessel consisting of a plurality of fuel assemblies arranged side by side and vertically, immersed in pressurized light water forming the moderator and cooling fluid of the reactor, each of said fuel assemblies having a bundle of fuel rods each having a central portion containing enriched fuel material and upper and lower end portions containing fertile material, whereby two layers of neutron absorbing fertile material are formed at the lower part of the core and the upper part of the core, throughout the cross-section of the core and further having a plurality of guide tubes parallel to said fuel rods and distributed in said fuel assemblies.

a plurality of clusters consisting of a plurality of control rod clusters containing neutron absorbing material and movable vertically along some only of said guide tubes in first ones of said plurality of fuel assemblies to control the power of the reactor, said first ones of said fuel assemblies being distributed regularly throughout the core, and of a plurality of clusters of neutron energy spectrum variation rods containing fertile material, all rods of a same cluster being vertically movable between a position of full insertion into all those guide tubes of a same one of said first fuel assemblies which do not receive said control rod clusters and a position out of said guide tubes;

whereby all said fuel assemblies other than said first fuel assemblies in the core are continuously devoid of said clusters;

and a plurality of actuating devices each associated with one of said spectrum variation rod clusters for movement thereof between said two positions to vary the ratio of water to the volume of fissile material in the core and to shift the neutron energy spectrum.

3. A nuclear reactor as claimed in claim 2, wherein each of said upper and lower end positions comprises pellets of U235 depleted uranium dioxide arranged in tubular sheaths of said fuel rods.

4. A nuclear reactor as claimed in claim 1, wherein said filling is of stainless steel.

5. A pressurized water nuclear reactor as claimed in claim 1, wherein each of said fuel rods has a sheath and a stack of pellets in said sheath, the pellets at the lower part and at the upper part of said sheath being of U235 depleted uranium dioxide while the central portion of said sheath contains U235 enriched uranium dioxide.

6. A pressurized water nuclear reactor as claimed in claim 2, wherein substantially one fuel assembly out of two in the core is associated with one spectrum variation rod cluster and one control rod cluster and the arrangement in the cross-section of the core of the fuel assemblies associated with said rod clusters and the fuel assemblies without said rod clusters is according to a checker board pattern.

7. A pressurized water nuclear reactor as claimed in claim 2, wherein all of said fuel assemblies are identical.

8. A pressurized water nuclear reactor comprising:
a vessel;
a core in said vessel consisting of a plurality of fuel assemblies arranged side by side and vertically, immersed in pressurized light water forming the moderator and cooling fluid of the reactor, each of said fuel assemblies having a bundle of fuel rods each containing enriched fuel material and plurality of guide tubes;

a plurality of clusters of control rods containing neutron absorbing material and movable vertically along some only of said guide tubes in first ones of said plurality of fuel assemblies for control of the power of the reactor, said first fuel assemblies being distributed regularly throughout the core;

a plurality of clusters of neutron energy spectrum variation rods containing fertile material, all rods of a same cluster being vertically movable between a position of full insertion into those guide tubes of a same one of said first fuel assemblies which do not receive said control rod clusters and a position out of said guide tubes;

all of said fuel assemblies other than said first fuel assemblies in the core being devoid of said clusters of control rods and clusters of spectrum variation rods and having plugs closing the guide tubes thereof;

and a plurality of actuating devices each associated with one of said spectrum variation rod clusters for movement thereof between said two positions to vary the ratio of water to the volume of fissile material in the core and to shift the neutron energy spectrum.

9. A pressurized water nuclear reactor as claimed in claim 8, wherein one fuel assembly out of two in the core is associated with one spectrum variation rod cluster and one control rod cluster and the arrangement in the cross-section of the core of the fuel assemblies associated with said clusters of control rods and said clusters of spectrum variation rods and the fuel assemblies without said clusters of control rods and said clusters of spectrum variation rods is according to a checker board pattern.

10. A pressurized water nuclear reactor as claimed in claim 8, wherein all of said fuel assemblies are identical.

11. A pressurized water nuclear reactor according to claim 1, wherein:
    all of said fuel assemblies are identical, and
    substantially all of those fuel assemblies which are arranged to receive said spectrum variation rod clusters are also arranged to receive said control rod clusters while substantially all of those fuel assemblies which are continuously devoid of one of said spectrum variation rod clusters and control rod clusters are also continuously devoid of the other of said spectrum variation rod clusters and control rod clusters during operation of the reactor.

* * * * *